(12) United States Patent
Lee et al.

(10) Patent No.: US 12,470,718 B2
(45) Date of Patent: Nov. 11, 2025

(54) METHOD FOR ENCODING/DECODING IMAGE USING BI-DIRECTIONAL OPTICAL FLOW PREDICTION

(71) Applicant: INTELLECTUAL DISCOVERY CO., LTD., Seoul (KR)

(72) Inventors: Ha Hyun Lee, Seoul (KR); Jung Won Kang, Daejeon (KR); Hyun Suk Ko, Daejeon (KR); Sung Chang Lim, Daejeon (KR); Jin Ho Lee, Daejeon (KR); Dong San Jun, Daejeon (KR); Hui Yong Kim, Daejeon (KR)

(73) Assignee: INTELLECTUAL DISCOVERY CO., LTD, Seoul (KR)

( * ) Notice: Subject to any disclaimer, the term of this patent is extended or adjusted under 35 U.S.C. 154(b) by 0 days.

(21) Appl. No.: 16/650,591

(22) PCT Filed: Sep. 28, 2018

(86) PCT No.: PCT/KR2018/011487
§ 371 (c)(1),
(2) Date: Mar. 25, 2020

(87) PCT Pub. No.: WO2019/066523
PCT Pub. Date: Apr. 4, 2019

(65) Prior Publication Data
US 2020/0236362 A1    Jul. 23, 2020

(30) Foreign Application Priority Data

Sep. 29, 2017  (KR) ......................... 10-2017-0128129
Jun. 22, 2018  (KR) ......................... 10-2018-0072370
Sep. 21, 2018  (KR) ......................... 10-2018-0113942

(51) Int. Cl.
*H04N 19/137*  (2014.01)
*H04N 19/117*  (2014.01)
(Continued)

(52) U.S. Cl.
CPC ......... *H04N 19/137* (2014.11); *H04N 19/117* (2014.11); *H04N 19/119* (2014.11);
(Continued)

(58) Field of Classification Search
None
See application file for complete search history.

(56) References Cited

U.S. PATENT DOCUMENTS 9,661,345 B2    5/2017  Lee et al.
10,397,599 B2   8/2019  Lim et al.
(Continued)

FOREIGN PATENT DOCUMENTS

KR    10-0431075 B1    5/2004
KR    10-0991568 B1    11/2010
(Continued)

OTHER PUBLICATIONS

International Search Report issued on Jan. 10, 2019 in counterpart International Patent Application No. PCT/KR2018/011487 (2 pages in English and 2 pages in Korean).
(Continued)

*Primary Examiner* — Mohammed Jebari
(74) *Attorney, Agent, or Firm* — BROADVIEW IP LAW, PC

(57) ABSTRACT

An image encoding/decoding method is disclosed. An image decoding method of the present invention may comprises determining step for determining whether or not to derive second motion information when a current block includes first motion information only and for which bi-directional prediction is available, a deriving step for deriving the second motion information based on the first motion information, and a predicting step for generating a prediction
(Continued)

block of the current block by performing BIO prediction based on the first motion information and the second motion information.

3 Claims, 10 Drawing Sheets

(51) Int. Cl.
| | | |
|---|---|---|
| *H04N 19/119* | (2014.01) | |
| *H04N 19/159* | (2014.01) | |
| *H04N 19/176* | (2014.01) | |
| *H04N 19/186* | (2014.01) | |
| *H04N 19/513* | (2014.01) | |
| *H04N 19/52* | (2014.01) | |
| *H04N 19/573* | (2014.01) | |

(52) U.S. Cl.
CPC ......... *H04N 19/159* (2014.11); *H04N 19/176* (2014.11); *H04N 19/186* (2014.11); *H04N 19/513* (2014.11); *H04N 19/52* (2014.11); *H04N 19/521* (2014.11); *H04N 19/573* (2014.11)

(56) References Cited

U.S. PATENT DOCUMENTS

| | | | |
|---|---|---|---|
| 2010/0246680 A1 | 9/2010 | Tian et al. | |
| 2011/0038414 A1* | 2/2011 | Song ................... | H04N 19/105 375/E7.243 |
| 2013/0028530 A1* | 1/2013 | Drugeon ............. | H04N 19/593 382/233 |
| 2015/0350671 A1* | 12/2015 | Alshin ................. | H04N 19/187 375/240.15 |
| 2017/0094305 A1 | 3/2017 | Li et al. | |
| 2018/0192072 A1* | 7/2018 | Chen ..................... | H04N 5/145 |
| 2018/0241998 A1* | 8/2018 | Chen ..................... | H04N 19/51 |
| 2018/0249172 A1* | 8/2018 | Chen ..................... | H04N 19/577 |
| 2019/0045218 A1* | 2/2019 | Ikai ...................... | H04N 19/523 |
| 2020/0154127 A1* | 5/2020 | Lee ...................... | H04N 19/139 |
| 2020/0221122 A1* | 7/2020 | Ye ....................... | H04N 19/103 |
| 2020/0267408 A1* | 8/2020 | Lee ....................... | H04N 19/56 |
| 2021/0105490 A1* | 4/2021 | Lim ..................... | H04N 19/176 |

FOREIGN PATENT DOCUMENTS

| | | |
|---|---|---|
| KR | 10-2014-0089486 A | 7/2014 |
| KR | 10-2015-0090454 A | 8/2015 |
| WO | WO 2017/036399 A1 | 3/2017 |
| WO | WO 2017/082698 A1 | 5/2017 |
| WO | WO 2017/134957 A1 | 8/2017 |

OTHER PUBLICATIONS

Chen, Jianle et al. "Algorithm Description of Joint Exploration Test Model 7 (JEM 7)". JVET-G1001-v1. Joint Video Exploration Team (JVET) of ITU-T SG 16 WP 3 and ISO/IEC JTC 1/SC 29/WG 11. 7th Meeting: Torino, IT, Jul. 13-21, 2017.

* cited by examiner

| (-1,1) | (0,-1) | (1,-1) | (2,-1) | (3,-1) | (4,-1) |
|---|---|---|---|---|---|
| (-1,0) | $G_{0,0}$ | $G_{1,0}$ | $G_{2,0}$ | $G_{3,0}$ | (4,0) |
| (-1,1) | $G_{0,1}$ | $G_{1,1}$ | $G_{2,1}$ | $G_{3,1}$ | (4,1) |
| (-1,2) | $G_{0,2}$ | $G_{1,2}$ | $G_{2,2}$ | $G_{0,2}$ | (4,2) |
| (-1,3) | $G_{0,3}$ | $G_{1,3}$ | $G_{2,3}$ | $G_{0,3}$ | (4,3) |
| (-1,4) | (0,4) | (1,4) | (2,4) | (3,4) | (4,4) |

|  |  |  |  |
|---|---|---|---|
|  | $G_{1,1}$ | $G_{2,1}$ |  |
|  | $G_{1,2}$ | $G_{2,2}$ |  |
|  |  |  |  |

|  |  |  |  |  |  |  |  |
|---|---|---|---|---|---|---|---|
|  | $G_{1,1}$ | $G_{2,1}$ | $G_{3,1}$ | $G_{4,1}$ | $G_{5,1}$ | $G_{6,1}$ |  |
|  | $G_{1,2}$ | $G_{2,2}$ | $G_{3,2}$ | $G_{4,2}$ | $G_{5,2}$ | $G_{6,2}$ |  |
|  | $G_{1,3}$ | $G_{2,6}$ | $G_{3,3}$ | $G_{4,3}$ | $G_{5,3}$ | $G_{6,3}$ |  |
|  | $G_{1,4}$ | $G_{2,6}$ | $G_{3,4}$ | $G_{4,4}$ | $G_{5,4}$ | $G_{6,4}$ |  |
|  | $G_{1,5}$ | $G_{2,6}$ | $G_{3,5}$ | $G_{4,5}$ | $G_{5,5}$ | $G_{6,5}$ |  |
|  | $G_{1,6}$ | $G_{2,6}$ | $G_{3,5}$ | $G_{4,6}$ | $G_{5,6}$ | $G_{6,6}$ |  |

FIG. 8A

| 1 | 1 | 1 | 1 |
|---|---|---|---|
| 1 | 1 | 1 | 1 |
| 1 | 1 | 1 | 1 |
| 1 | 1 | 1 | 1 |

FIG. 8B

| 1 | 2 | 2 | 1 |
|---|---|---|---|
| 2 | 4 | 4 | 2 |
| 2 | 4 | 4 | 2 |
| 1 | 2 | 2 | 1 |

FIG. 8C

| $S_0$ | $S_1$ | $S_2$ | $S_3$ |
|---|---|---|---|
| $S_4$ | $S_5$ | $S_6$ | $S_7$ |
| $S_8$ | $S_9$ | $S_{10}$ | $S_{11}$ |
| $S_{12}$ | $S_{13}$ | $S_{14}$ | $S_{15}$ |

FIG. 9A

| $S_{0,0}$ |  | $S_{2,0}$ |  |
|---|---|---|---|
|  |  |  |  |
| $S_{0,2}$ |  | $S_{2,2}$ |  |
|  |  |  |  |

FIG. 9B

|  | $S_{1,0}$ |  | $S_{3,0}$ |
|---|---|---|---|
|  |  |  |  |
|  | $S_{1,2}$ |  | $S_{3,2}$ |
|  |  |  |  |

FIG. 9C

| $S_{0,0}$ |  |  |  |
|---|---|---|---|
|  | $S_{1,1}$ |  |  |
|  |  | $S_{2,2}$ |  |
|  |  |  | $S_{2,3}$ |

FIG. 9D

|  |  |  | $S_{3,0}$ |
|---|---|---|---|
|  |  | $S_{2,1}$ |  |
|  | $S_{1,2}$ |  |  |
| $S_{0,3}$ |  |  |  |

FIG. 10A

FIG. 10B applying 5x5 window to
sub-group of size of 2x2

FIG. 10C applying 5x5 window to
sub-group of size of 4x4

FIG. 10D applying 5x5 window to
sub-group of size of 8x8

METHOD FOR ENCODING/DECODING IMAGE USING BI-DIRECTIONAL OPTICAL FLOW PREDICTION

CROSS REFERENCE TO RELATED APPLICATIONS

This application is a U.S. National Stage Application of International Application No. PCT/KR2018/011487, filed on Sep. 28, 2018, which claims the benefit under 35 USC 119(a) and 365(b) of Korean Patent Application No. 10-2017-0128129, filed on Sep. 29, 2017, Korean Patent Application No. 10-2018-0072370, filed on Jun. 22, 2018, and Korean Patent Application No. 10-2018-0113942, filed on Sep. 21, 2018 in the Korean Intellectual Property Office, the entire disclosure of which is incorporated herein by reference for all purposes.

TECHNICAL FIELD

The present invention relates to a method and apparatus for encoding/decoding an image, and a recording medium storing a bitstream. More particularly, the present invention relates to a method and apparatus for encoding/decoding an image on the basis of a block by using bi-directional optical flow.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

In a conventional method and apparatus for encoding/decoding an image by using bi-directional optical flow (BIO), BIO is applied to a case where two pieces of motion information are provided. Thus, applying BIO is not available to a case where one piece of motion information is provided.

DISCLOSURE

Technical Problem

The present invention is to provide a method and apparatus for applying BIO by deriving second motion information when an encoding/decoding target block includes one piece of motion information under a situation where bi-directional prediction is available.

In addition, a method and apparatus for variably providing a unit size of a sub-group for calculating a BIO offset so as to reduce complexity, a method and apparatus for calculating a BIO offset in a sub-group unit, and a method and apparatus for performing encoding/decoding by selecting whether or not to apply BIO in a block unit are provided.

Technical Solution

A method of decoding an image according to an embodiment of the present invention may comprise a determining step for determining whether or not to derive second motion information when a current block includes first motion information only and for which bi-directional prediction is available, a deriving step for deriving the second motion information based on the first motion information, and a predicting step for generating a prediction block of the current block by performing BIO prediction based on the first motion information and the second motion information.

In the method of decoding an image of the present invention, the determining step may be performed based on the first motion information.

In the method of decoding an image of the present invention, the determining step may determine to derive the second motion information when a first motion vector included in the first motion information is smaller than a predetermined threshold value.

In the method of decoding an image of the present invention, the threshold value may be determined based on at least one of a size and a form of the current block.

In the method of decoding an image of the present invention, the deriving step may derive the second motion information based on a temporal distance between a current picture including the current block and reference pictures.

In the method of decoding an image of the present invention, the deriving step may derive the second motion information such that a prediction direction of a reference picture referenced by the first motion information differs from a prediction direction of a reference picture referenced by the second motion information.

In the method of decoding an image of the present invention, the predicting step may comprise a motion correction vector calculating step for calculating a BIO offset of the current block, and the motion correction vector may be calculated in a pixel unit or in a sub-group unit.

In the method of decoding an image of the present invention, a size of the sub-group unit may be determined based on at least one of a size and a form of the current block.

In the method of decoding an image of the present invention, when BIO prediction in the sub-group unit is performed for the current block, at least one of deblocking filtering and inverse-transform for the current block may be performed in the sub-group unit.

A method of encoding an image according to another embodiment of the present invention may comprise a determining step for determining whether or not to derive second motion information when a current block includes first motion information only and for which bi-directional prediction is available, a deriving step for deriving the second motion information based on the first motion information, and a predicting step for generating a prediction block of the current block by performing BIO prediction based on the first motion information and the second motion information.

In the method of encoding an image of the present invention, the determining step may performed based on the first motion information.

In the method of encoding an image of the present invention, the determining step may determine to derive the second motion information when a first motion vector included in the first motion information is smaller than a predetermined threshold value.

In the method of encoding an image of the present invention, the threshold value may be determined based on at least one of a size and a form of the current block.

In the method of encoding an image of the present invention, the deriving step may derive the second motion information based on a temporal distance between a current picture including the current block and reference pictures.

In the method of encoding an image of the present invention, the deriving step may derive the second motion information such that a prediction direction of a reference picture referenced by the first motion information differs from a prediction direction of a reference picture referenced by the second motion information.

In the method of encoding an image of the present invention, the predicting step may comprise a motion correction vector calculating step for calculating a BIO offset of the current block, and the motion correction vector may be calculated in a pixel unit or in a sub-group unit.

In the method of encoding an image of the present invention, a size of the sub-group unit may be determined based on at least one of a size and a form of the current block.

In the method of encoding an image of the present invention, when BIO prediction in the sub-group unit is performed for the current block, at least one of deblocking filtering, transform and inverse-transform for the current block may be performed in the sub-group unit.

A computer-readable recording medium according to another embodiment of the present invention may store a bitstream that is generated by an image encoding method and/or apparatus according to the present invention.

Advantageous Effects

According to the present invention, an image encoding/decoding method and apparatus having improved coding efficiency may be provided.

According to the present invention, a method and apparatus for applying BIO by deriving second motion information when an encoding/decoding target block includes one piece of motion information under a situation where bi-directional prediction is available may be provided.

In addition, according to the present invention, a method and apparatus for variably providing a unit size of a sub-group for calculating a BIO offset so as to reduce complexity, a method and apparatus for calculating a BIO offset in a sub-group unit, and a method and apparatus for performing encoding/decoding by selecting whether or not to apply BIO in a block unit may be provided.

DESCRIPTION OF DRAWINGS

FIGS. 8A, 8B and 8C are views showing a weight that may be applied to each S value within a sub-group so as to calculate a sub-group $S_{group}$.

FIGS. 9A, 9B, 9C and 9D are views showing an embodiment of an S value by a weighted sum of S values at specific positions within a sub-group so as to calculate an $S_{group}$ of a sub-group.

FIGS. 10A, 10B, 10C and 10D are views showing an embodiment of calculating an S value.

MODE FOR INVENTION

Figure 1:
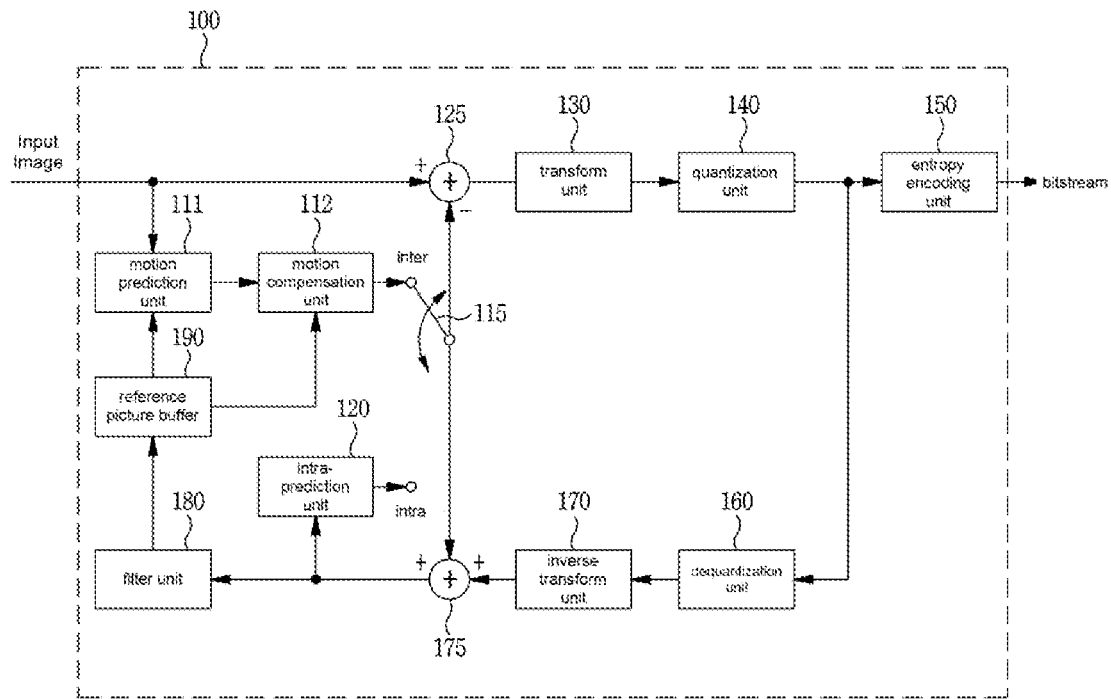
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may mean a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Prediction list utilization flag: may represent whether a prediction block is generated using at least one reference image included in a specific reference picture list. An inter prediction indicator may be derived using a prediction list utilization flag, and reversely, a prediction list utilization flag may be derived using an inter prediction indicator. For example, when a prediction list utilization flag indicates a first value of "0", it represents a prediction block is not generated using a reference picture included in the corresponding reference picture list. When a prediction list utilization flag indicates a second value of "1", it represents a prediction block is generated using a reference picture included in the corresponding reference picture list.

Reference Picture Index: may mean an index indicating a specific reference picture in a reference picture list.

Reference Picture: may mean a picture to which a specific block refers for inter-picture prediction or motion compensation. Alternatively, a reference picture may be a picture including a reference block referred to by a current block for inter prediction or motion compensation. Hereinafter, the term "reference picture" and "reference image" may be used as the same meaning and used interchangeably.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Search Range: may be a 2-dimensional region where search for a motion vector during inter prediction is performed. For example, a size of a search range may be M×N. M and N may be a positive integer, respectively.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list configured using one or more motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: may mean a list composed of merge candidates.

Merge Candidate: may mean a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: may mean an indicator indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, a inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
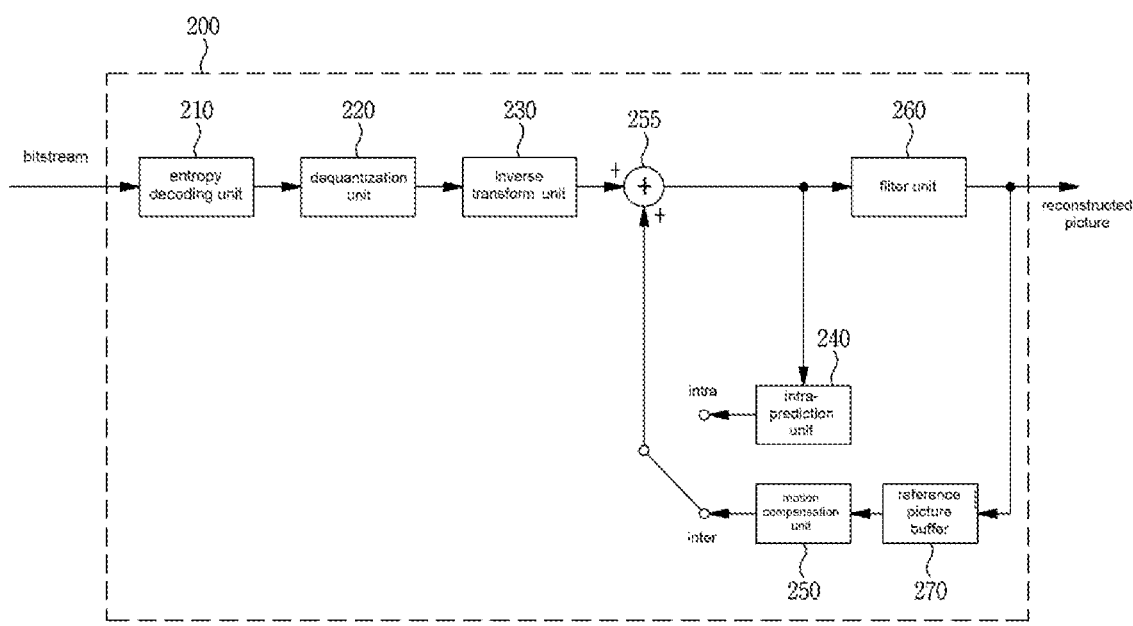
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, a inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be a inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
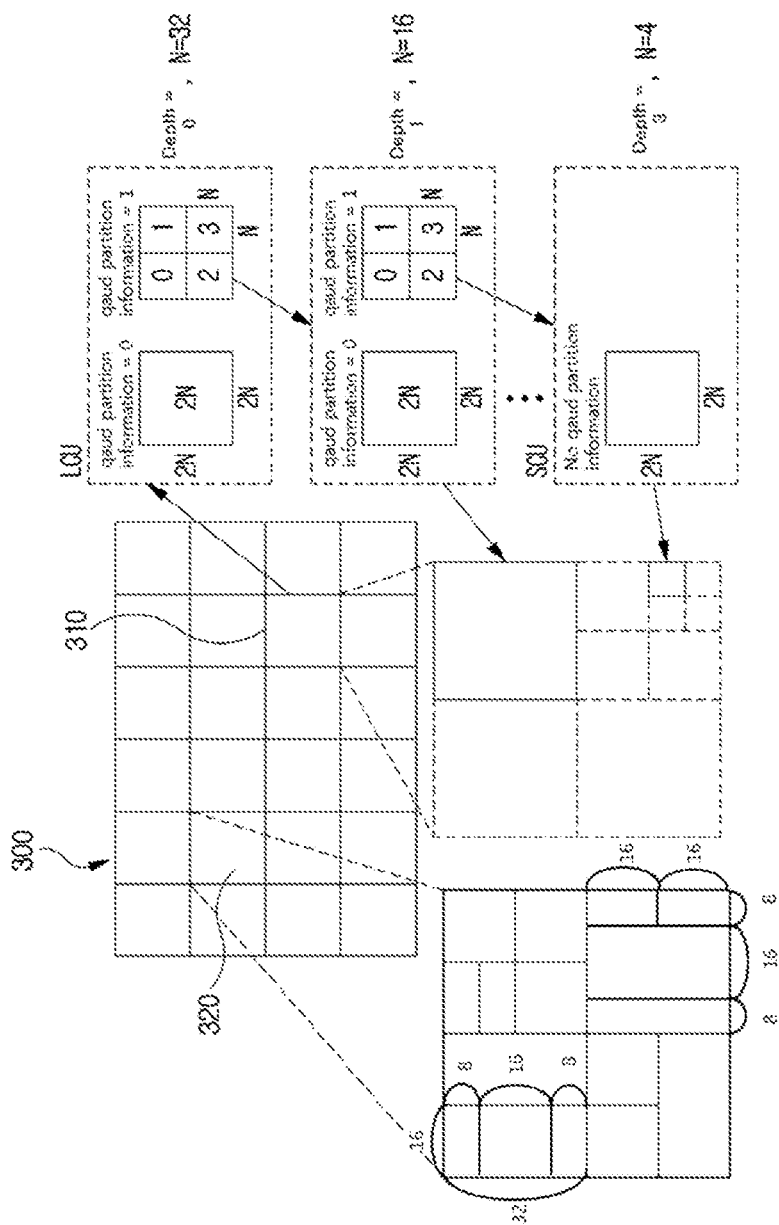
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned.

Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
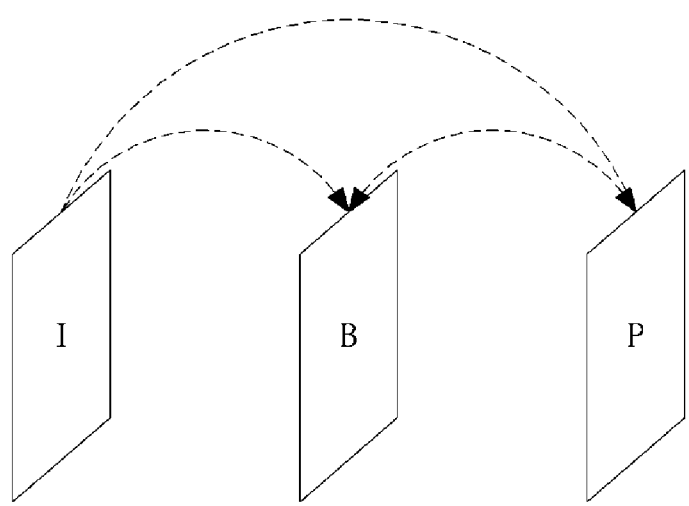
FIG. 4 is a diagram illustrating an embodiment of an inter-picture prediction process.

FIG. 4 is a diagram illustrating an embodiment of an inter-picture prediction process.

In FIG. 4, a rectangle may represent a picture. In FIG. 4, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the motion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Hereinafter, a detailed embodiment according to the present invention will be described with reference to FIGS. 5 to 13.

BIO (bi-directional optical flow) may mean a technique of motion correction in a pixel or sub-block unit which is performed on the basis of motion compensation based on a block.

For example, when a pixel value $I_t$ at a time t is provided, Formula 1 may be calculated by using a primary Taylor expansion.

$$I_t = I_{t0} + \frac{\partial I_{t0}}{\partial t}(t - t_0) \qquad \text{[Formula 1]}$$

When $I_{t0}$ is positioned on a motion trajectory of $I_t$, and assuming that optical flow is valid along the motion trajectory, Formula 2 may be established.

$$0 = \frac{dI}{dt} = \frac{\partial I}{\partial t} + \frac{\partial I}{\partial x} \cdot \frac{\partial x}{\partial t} + \frac{\partial I}{\partial y} \cdot \frac{\partial y}{\partial t} \qquad \text{[Formula 2]}$$

$$\frac{\partial I}{\partial t} = -\frac{\partial I}{\partial x} \cdot \frac{\partial x}{\partial t} - \frac{\partial I}{\partial y} \cdot \frac{\partial y}{\partial t}$$

$$G_x = \frac{\partial I}{\partial x}, G_y = \frac{\partial I}{\partial y}$$

Based on the above, Formula 3 below may be derived from Formula 1.

$$I_t = I_{t0} - G_{x0} \cdot \frac{\partial x}{\partial t} \cdot (t - t_0) - G_{y0} \cdot \frac{\partial y}{\partial t} \cdot (t - t_0) \qquad \text{[Formula 3]}$$

Considering $\partial x/\partial t$ and $\partial y/\partial t$ as a motion speed, the same may be represented as $V_{x0}$ and $V_{y0}$. Accordingly, Formula 4 below may be derived from Formula 3.

$$I_t = I_{t0} - G_{x0} \cdot V_{x0} \cdot (t-t_0) - G_{y0} \cdot V_{y0} \cdot (t-t_0) \qquad \text{[Formula 4]}$$

When a forward directional reference picture at time t0 and a backward directional reference picture at a time $t_1$ are provided, and $(t-t_0)=(t-t_1)=\Delta t=1$, a pixel value at a time t may be calculated on the basis of Formula 5 below.

$$I_t = I_{t0} - G_{x0} \cdot V_{x0} \cdot (t - t_0) - G_{y0} \cdot V_{y0} \cdot (t - t_0) = \qquad \text{[Formula 5]}$$

$$I_{t0} + G_{x0} \cdot V_{x0} + G_{y0} \cdot V_{y0}$$

$$I_t = I_{t1} - G_{x1} \cdot V_{x1} \cdot (t - t_1) - G_{y1} \cdot V_{y1} \cdot (t - t_1) =$$

$$I_{t1} - G_{x1} \cdot V_{x1} - G_{y1} \cdot V_{y1}$$

$$I_t = \frac{I_{t0} + I_{t1}}{2} + \frac{(G_{x0} \cdot V_{x0} - G_{x1} \cdot V_{x1}) + (G_{y0} \cdot V_{y0} - G_{y1} \cdot V_{y1})}{2}$$

In addition, since motion follows a trajectory, it may be assumed to be $V_{x0}=V_{x1}=V_x$, $V_{y0}=V_{y1}=V_y$. Accordingly, Formula 6 below may be derived from Formula 5.

$$I_t = \frac{I_{t0} + I_{t1}}{2} + \frac{(G_{x0} \cdot V_{x0} - G_{x1} \cdot V_{x1}) + (G_{y0} \cdot V_{y0} - G_{y1} \cdot V_{y1})}{2} = \frac{I_{t0} + I_{t1}}{2} + \frac{\Delta G_x \cdot V_x + \Delta G_y \cdot V_y}{2}$$
$$\Delta G_x = G_{x0} - G_{x1}, \Delta G_y = G_{y0} - G_{y1}$$

[Formula 6]

In the above Formula, $\Delta G_x$, $\Delta G_y$ may be calculated from reconstructed reference pictures.

In Formula 6, $$\frac{I_{t0} + I_{t1}}{2}$$

may correspond to general bi-directional prediction. In addition, $$\frac{\Delta G_x \cdot V_x + \Delta G_y \cdot V_y}{2}$$

may mean a BIO offset.

Motion correction vectors $V_x$ and $V_y$ may be calculated in the encoder and the decoder by using Formula 7 below.

$$\min\left\{\sum_{block}((I_{t0} + G_{x0} \cdot V_x + G_{y0} \cdot V_y) - (I_{t1} - G_{x1} \cdot V_x - G_{y1} \cdot V_y))2\right\} =$$
$$\min\left\{\sum_{block}(\Delta I + (G_{x0} + G_{x1}) \cdot V_x + (G_{y0} + G_{y1}) \cdot V_y)^2\right\}$$
$$v_x = (s_1 + r) > m \,?\, \text{clip3}\left(-\text{limit}, \text{limit}, -\frac{s_3}{(s_1 + r)}\right) : 0$$
$$v_y = (s_5 + r) > m \,?\, \text{clip3}\left(-\text{limit}, \text{limit}, -\frac{s_6 - \frac{v_x s_2}{2}}{(s_5 + r)}\right) : 0$$

[Formula 7]

In Formula 7, $s_1$, $s_2$, $s_3$, $s_5$, and $s_6$ may be calculated by using pixel values at times $t_0$, $t_1$, and $G_0$, $G_{x1}$, $G_{y0}$ and $G_{y1}$.

In the present invention, $s_1$, $s_2$, $s_3$, $s_5$, and $s_6$ may be represented as s.

Based on $V_x$ and $V_y$ calculated in a pixel unit or sub-block unit and Formula 6, a final prediction signal of a block may be calculated.

When two reference pictures different from each other are positioned temporally before or temporally after a current picture, a prediction signal at a time t may be calculated by Formula 8 and in consideration of a temporal distance between the current picture and the reference pictures.

$$I_t = I_{t0} - G_{x0} \cdot V_{x0} \cdot (t - t_0) - G_{y0} \cdot V_{y0} \cdot (t - t_0) =$$
$$I_{t0} + G_{x0} \cdot V_{x0} \cdot TD_0 + G_{y0} \cdot V_{y0} \cdot TD_0$$
$$I_t = I_{t1} - G_{x1} \cdot V_{x1} \cdot (t - t_1) - G_{y1} \cdot V_{y1} \cdot (t - t_1) =$$
$$I_{t1} - G_{x1} \cdot V_{x1} \cdot TD_1 - G_{y1} \cdot V_{y1} \cdot TD_1$$
$$I_t = \frac{I_{t0} + I_{t1}}{2} + \frac{(G_{x0} \cdot V_{x0} \cdot TD_0 - G_{x1} \cdot V_{x1} \cdot TD_1) + (G_{y0} \cdot V_{y0} \cdot TD_0 - G_{y1} \cdot V_{y1} \cdot TD_1)}{2}$$
$$I_t = \frac{I_{t0} + I_{t1}}{2} + \frac{(G'_{x0} \cdot V_{x0} - G'_{x1} \cdot V_{x1}) + (G'_{y0} \cdot V_{y0} - G'_{y1} \cdot V_{y1})}{2}$$
$$G'_{x0} = G_{x0} \cdot TD_0, G'_{y0} = G_{y0} \cdot TD_0, G'_{x1} = G_{x1} \cdot TD_1, G'_{y1} = G_{y1} \cdot TD_1$$

[Formula 8]

According to an embodiment of the present invention, when a picture or a slice or both including a current block may be encoded/decoded through inter-prediction by using reference pictures is present in a bi-directional reference picture list, encoding/decoding may be performed by applying BIO even though the current block includes only first motion information. The first motion information of the present invention may mean motion information of an L0 direction or motion information of an L1 direction of the current block.

According to the present invention, when a current block includes only first motion information, encoding/decoding may be performed by applying BIO after deriving second motion information.

When deriving second motion information, whether or not to derive second motion information may be determined on the basis of a first motion vector of a current block.

For example, whether or not to derive second motion information may be determined on the basis of a result of comparing a first motion vector value of a current block with a predetermined threshold value. For example, as Formula 9 below, whether or not to derive second motion information may be determined according to sizes of first X directional motion vector $MV_{x0}$ and y directional motion vector $MV_{y0}$ of a current block. According to an embodiment, when both of $MV_{x0}$ and $MV_{y0}$ are equal to or smaller than a threshold value, it may be determined to derive second motion information.

$$|MV_{x0}|<=Th \,\&\&\, |MV_{y0}|<=Th$$

[Formula 9]

When it is determined to derive second motion information, for example, when the above condition is satisfied, second motion information may be derived on the basis of first motion information of a current block. In addition, BIO may be applied to the current block by using the first motion information and the derived second motion information.

A threshold value Th for determining whether or not to derive second motion information may be a predefined predetermined value, or may be transmitted by being included in a bitstream. The threshold value may be adaptively determined on the basis of a coding parameter of a current block such as a size or a form or both of the current block.

For example, a threshold value may be transmitted in a sequence parameter, a picture parameter, a slice header, and syntax data of a block level.

Second motion information may be derived on the basis of a temporal distance between a current picture and reference pictures.

FIGS. 5 5A, 5B and 5C are views showing various embodiments for deriving second motion information on the basis of first motion information.

Figure 5A:
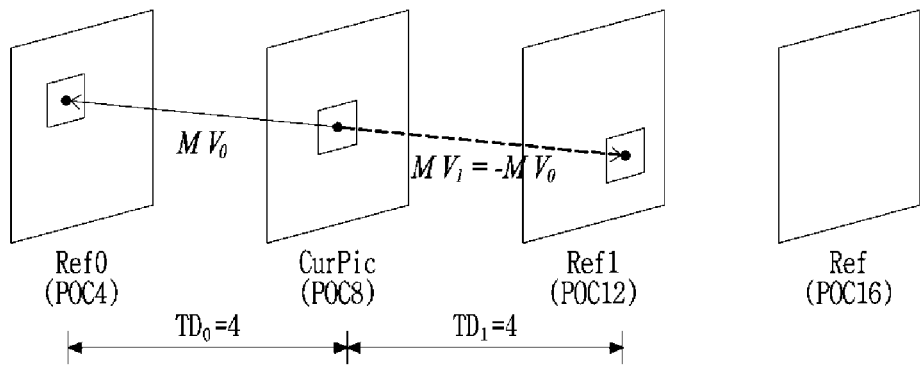
FIGS. 5A, 5B and 5C are views showing various embodiments for deriving second motion information on the basis of first motion information.

For example, as shown in FIG. 5A, when a picture, having a temporal distance identical to a temporal distance $TD_0$ between a current picture CurPic and a first reference picture Ref0 indicated by first motion information $MV_0$ of the current block, is present in a second reference picture list having a POC differing from a first reference picture Ref0, second motion information $MV_1$ may be derived by using the corresponding picture as a second reference picture Ref1.

When a picture having an identical temporal distance is used as a second reference picture, a second motion vector may be derived from a first motion vector as Formula 10 below.

$$MV_{x1}=-MV_{x0}, MV_{y1}=-MV_{y0} \quad \text{[Formula 10]}$$

Figure 5B:
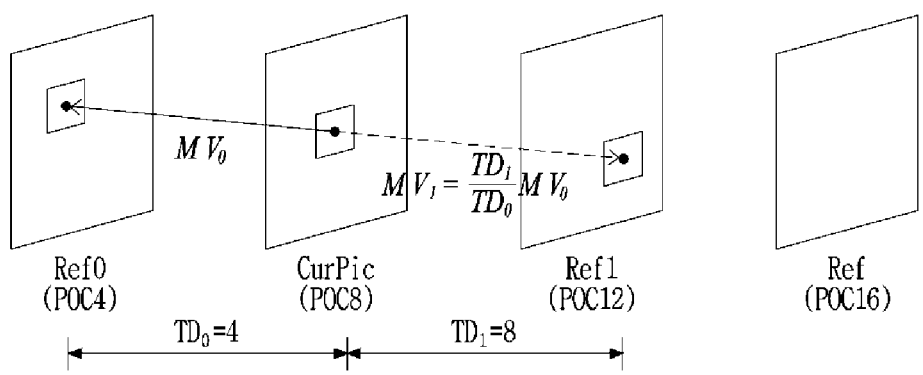

For example, as shown in FIG. 5B, when a picture, having a temporal distance identical to a temporal distance $TD_0$ between a current picture CurPic and a first reference picture Ref0 indicated by first motion information MV0 of a current block, is not present in a second reference picture list, second motion information $MV_1$ may be derived by using a picture having a minimum temporal distance with the current picture CurPic and differing in POC from the first reference picture Ref0 as a second reference picture Ref1.

In an example above, a second motion vector $MV_1$ may be derived as Formula 11 below by using, a first motion vector $MV_0$, a temporal distance $TD_0$ between and a current picture CurPic and a first reference picture Ref0, and a temporal distance $TD_1$ between a current picture CurPic and a second reference picture Ref1.

$$MV_{x1} = \frac{TD_1}{TD_0} \cdot MV_{x0}, \, MV_{y1} = \frac{TD_1}{TD_0} \cdot MV_{y0} \quad \text{[Formula 11]}$$

For example, regardless of a temporal distance $TD_0$ between a current picture CurPic and a first reference picture Ref0 indicated by first motion information $MV_0$ of a current block, second motion information $MV_1$ may be derived by using a picture having a minimum temporal distance within a current picture CurPic in a second reference picture list, and differing in POC with the first reference picture Ref0 as a second reference picture Ref1.

In an example above, a second motion vector $MV_1$ may be derived as Formula 12 below by using a first motion vector $MV_0$, a temporal distance $TD_0$ between a current picture CurPic and a first reference picture Ref0, and a temporal distance $TD_1$ between the current picture CurPic and a second reference picture Ref1.

$$MV_{x1} = \frac{TD_1}{TD_0} \cdot MV_{x0}, \, MV_{y1} = \frac{TD_1}{TD_0} \cdot MV_{y0} \quad \text{[Formula 12]}$$

When deriving second motion information $MV_1$, second motion information $MV_1$ may be derived by using a current picture CurPic, and reference pictures within a reference picture list which differ in direction with first motion information ($MV_0$ and $Ref_0$) of a current block.

Figure 5C:
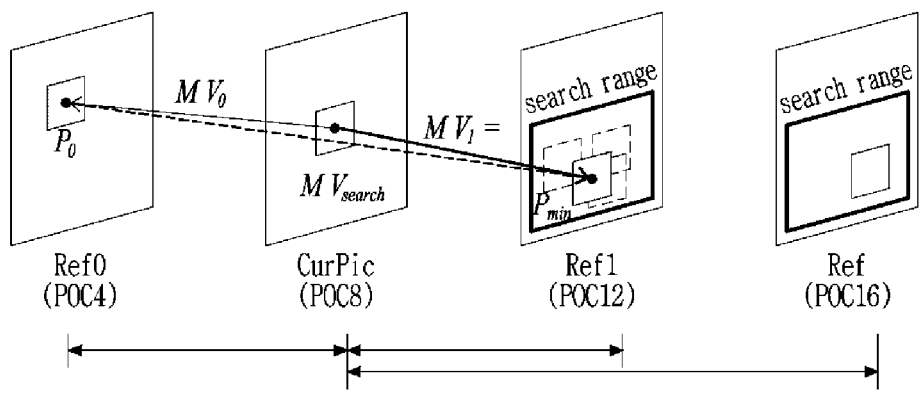

For example, as shown in FIG. 5C, for reference pictures within a reference picture list which differ in direction, a block having a minimum distortion value with a prediction block $P_0$ may be determined within a predetermined area on the basis of the prediction block $P_0$ generated from first motion information of a current block. As an initial motion vector for motion determination, a motion vector of (0,0) indicating a position identical to a current block may be used, or as shown in FIG. 5A or FIG. 5B, a block having a minimum distortion value may be determined within a predetermined area by using a motion vector derived on the basis of a first motion vector $MV_0$ as an initial motion vector.

Second motion information of a current block may be derived as Formula 13 below by using a block $P_{min}$ having a minimum distortion value with a prediction block $P_0$, $MV_{search}$ representing a distance offset between prediction blocks $P_0$, $MV_0$ representing a distance offset between the $MV_{search}$ current block and the prediction block $P_0$. In addition, a reference picture index of a reference picture Ref1 including a prediction block $P_{min}$ may be used as a reference picture index of second motion information.

$$MV_{x1}=MV_{search,x}+MV_{x0}$$

$$MV_{y1}=MV_{search,y}+MV_{y0} \quad \text{[Formula 13]}$$

When second motion information calculated from the above embodiments is usable, a final prediction signal may be generated by applying BIO to a current block in a pixel unit or sub-block unit by using a first reference picture $Ref_0$ and first motion information of a current block, and a second reference picture $Ref_1$ and second motion information of the current block.

When applying BIO to a current block by using first motion information and second motion information, when a first reference picture $Ref_0$ indicated by first motion information and a second reference picture $Ref_1$ indicated by second motion information are present in temporal axis different from each other based on a current picture at a time t and a temporal distance $TD_0$ between a current picture and the first reference picture and a temporal distance $TD_1$ between the current picture and the second reference picture are different, a BIO offset may be calculated in consideration of a temporal distance between the current picture and the reference pictures.

For example, when a condition below is satisfied, a final prediction signal of a current block may be calculated by calculating a BIO offset as Formula 14 below in consideration of a temporal distance between a current picture and reference pictures.

$$TD_0 = (t_0 - t),\, TD_1 = (t - t_1),\, TD_0 \times TD_1 > 0,\, TD_0 \neq TD_1 \quad \text{[Formula 14]}$$

$$I_t = I_{t0} - G_{x0} \cdot V_{x0} \cdot (t - t_0) - G_{y0} \cdot V_{y0} \cdot (t - t_0) =$$

$$I_{t0} + G_{x0} \cdot V_{x0} \cdot TD_0 + G_{y0} \cdot V_{y0} \cdot TD_0$$

$$I_t = I_{t1} - G_{x1} \cdot V_{x1} \cdot (t - t_1) - G_{y1} \cdot V_{y1} \cdot (t - t_1) =$$

$$I_{t1} - G_{x1} \cdot V_{x1} \cdot TD_1 - G_{y1} \cdot V_{y1} \cdot TD_1$$

$$I_t = \frac{I_{t0} + I_{t1}}{2} + \frac{(G_{x0} \cdot V_{x0} \cdot TD_0 - G_{x1} \cdot V_{x1} \cdot TD_1) +}{2} + \frac{(G_{y0} \cdot V_{y0} \cdot TD_0 - G_{y1} \cdot V_{y1} \cdot TD_1)}{2}$$

$$I_t = \frac{I_{t0} + I_{t1}}{2} +$$

$$\frac{(G'_{x0} \cdot V_{x0} - G'_{x1} \cdot V_{x1}) + (G'_{y0} \cdot V_{y0} - G'_{y1} \cdot V_{y1})}{2}$$

$$G'_{x0} = G_{x0} \cdot TD_0,\, G'_{y0} = G_{y0} \cdot TD_0,\, G'_{x1} =$$

$$G_{x1} \cdot TD_1,\, G'_{y1} = G_{y1} \cdot TD_1$$

When applying BIO to a current block by using first motion information and second motion information, when a first reference picture Ref0 indicated by first motion information and a second reference picture Ref1 indicated by second motion information are present in temporal axis different from each other based on a current picture at a time t, a motion vector of the first motion information is (0,0), and a motion vector of the second motion information is (0,0), BIO may not be applied to the current block.

Gradients $G_{x0}$, $G_{x1}$, $G_{y0}$, and $G_{y1}$ used when calculating a BIO offset may be calculated by using first motion information and second motion information.

When a motion vector indicates a sub-pixel position within a reference picture, by applying filters using pixel values of neighbor integer positions, gradient values of vertical and horizontal directional components at the corresponding sub-pixel position may be calculated. Tables 1 and 2 below represent a filter coefficient of an interpolation filter.

TABLE 1

| Pixel position | interpolation filter for calculating a gradient | | | | | |
|---|---|---|---|---|---|---|
| 0 | 8 | −39 | −3 | 46 | −17 | 5 |
| 1/16 | 8 | −32 | −13 | 50 | −18 | 5 |
| 1/8 | 7 | −27 | −20 | 54 | −19 | 5 |
| 3/16 | 6 | −21 | −29 | 57 | −18 | 5 |
| 1/4 | 4 | −17 | −36 | 60 | −15 | 4 |
| 5/16 | 3 | −9 | −44 | 61 | −15 | 4 |
| 3/8 | 1 | −4 | −48 | 61 | −13 | 3 |
| 7/16 | 0 | 1 | −54 | 60 | −9 | 2 |
| 1/2 | 1 | 4 | −57 | 57 | −4 | 1 |

TABLE 2

| Pixel position | Interpolation filter for prediction signal | | | | | |
|---|---|---|---|---|---|---|
| 0 | 0 | 0 | 64 | 0 | 0 | 0 |
| 1/16 | 1 | −3 | 64 | 4 | −2 | 0 |
| 1/8 | 1 | −6 | 62 | 9 | −3 | 1 |
| 3/16 | 2 | −8 | 60 | 14 | −5 | 1 |
| 1/4 | 2 | −9 | 57 | 19 | −7 | 2 |
| 5/16 | 3 | −10 | 53 | 24 | −8 | 2 |
| 3/8 | 3 | −11 | 50 | 29 | −9 | 2 |
| 7/16 | 3 | −11 | 44 | 35 | −10 | 3 |
| 1/2 | 3 | −10 | 35 | 44 | −11 | 3 |

When a motion vector indicates a sub-pixel position, gradient values of vertical and horizontal directional components may be calculated by performing rounding to an integer pixel position close to the corresponding sub-pixel position and by using neighbor integer pixel values. Herein, gradient values of vertical and horizontal directional components may be calculated by using a filter coefficient at a pixel position 0 of Table 1. For example, in case of a precision of a 1/16 motion vector and a size of horizontal and vertical directional motion vector is (15, 15), rounding is performed as Formula 15 below so that a motion vector has a value of (16, 16), and a gradient value of a horizontal directional component may be calculated by using pixel values of integer pixel positions and a filter coefficient of (8, −39, −3, 46, −17, 5). In case of a precision of a 1/16 motion vector, a value of shift may be 4, and in case of a precision of a 1/8 motion vector, a value of shift may be 3.

roundMV(x,y)=(($MV_x$+(1<<shift−1))>>shift)<<shift, (($MV_y$+(1<<shift−1))>>shift)<<shift    [Formula 15]

When a motion vector indicates a sub-pixel position, pixel values interpolated at the corresponding sub-pixel position may be generated, and then gradient values of vertical and horizontal directional components at the corresponding sub-pixel position may be calculated by using the interpolated pixel values. A gradient at the corresponding sub-pixel position may be calculated by using a [−1, 0, 1] filter for the interpolated pixel values.

FIGS. 6A, 6B, 6C and 6D are views showing an example of calculating gradient values of vertical and horizontal directional components by generating interpolated pixel values at the sub-pixel position and using the interpolated pixel values.

Figures 6A, 6B, 6C, 6D:
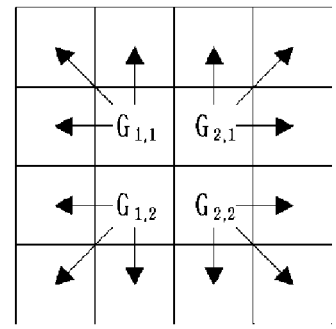
FIGS. 6A, 6B, 6C and 6D are views showing an example of calculating gradient values

An embodiment shown in FIG. 6A is to calculate a gradient at all pixel positions of a 4×4 block, that is, an embodiment where pixels values of an area filled with a pattern are required. For example, when a [−1, 0, 1] filter is applied to calculate a gradient value at each position within a 4×4 block, for example, in order to calculate a gradient ($G_{0,0}$) in a horizontal direction at a left upper position of (0, 0), a pixel value at a position of (−1, 0) that is outside of the 4×4 block is required. In addition, in order to calculate a gradient ($G_{3,0}$) in a horizontal direction at a right upper position of (3, 0), a pixel value at a position of (4, 0) that is outside of the 4×4 block is required. In order to generate interpolated pixel values of a block having a W(horizontal)×H(vertical) size, (W+7)×(H+7) pixel values from a reference picture are required when 8-tab interpolation filter is applied. In addition to the above, in order to additionally calculate a gradient value, total of (W+7+2)×(H+7+2) pixel values are required whereby two pixels are respectively increased in horizontal and vertical directions.

In order to reduce a memory bandwidth for a reference picture, as shown in FIG. 6B, a gradient value at inward positions of a 4×4 block may be calculated and the calculated gradient value may be used for calculating a BIO offset. For example, in case of a 4×4 block, a gradient at (1, 1), (2, 1), (1, 2), and (2, 2) which are inside of the block may be calculated and used. In FIG. 6C, an embodiment is shown where a gradient at inward positions of an 8×8 block is calculated.

In addition, for a position for which a gradient is not calculated, a gradient calculated from the inside of the block may be copied and used. In FIG. 6D, an embodiment is shown where a gradient calculated from the inside of a block is copied and used. For example, as shown in FIG. 6D, for a position for which a gradient value is not calculated, a gradient value of a position adjacent thereto may be used as a gradient value of the corresponding position.

Motion correction vectors $V_x$ and $V_y$ for calculating a BIO offset of a current block may be calculated in a pixel unit or at least a sub-group unit.

When calculating in a sub-group unit, a size of a sub-group may be determined on the basis of a ratio of a horizontal size to a vertical size of a current target block, or information related to a sub-group size may be entropy encoded/decoded. In addition, a sub-group unit having a fixed size predefined according to a size or a form or both of a current block may be used.

FIGS. 7A, 7B, 7C and 7D are views showing various embodiments of a sub-group that becomes a unit for calculating a BIO offset.

Figure 7A:
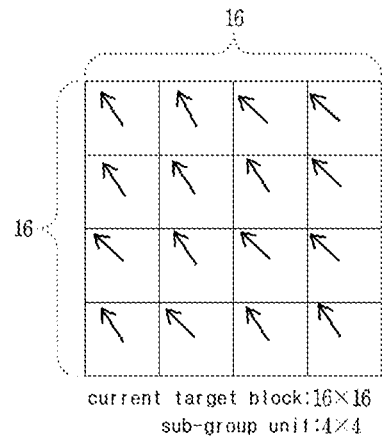
FIGS. 7A, 7B, 7C and 7D are views showing various embodiments of a sub-group that becomes a unit for calculating a BIO offset.

For example, as shown in FIG. 7A, when a size of a current target block is 16×16, $V_x$ and $V_y$ may be calculated in a 4×4 sub-group unit.

Figure 7B:
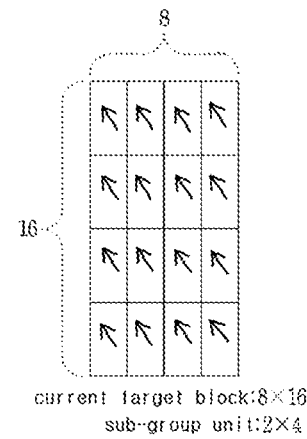

For example, as shown in FIG. 7B, when a size of a current target block is 8×16, $V_x$ and $V_y$ may be calculated in a 2×4 sub-group unit.

Figure 7C:
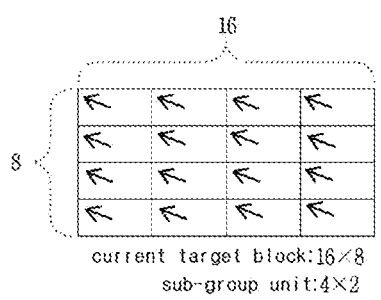

For example, as shown in FIG. 7C, when a size of a current target block is 16×8, $V_x$ and $V_y$ may be calculated in a 4×2 sub-group unit.

Figure 7D:
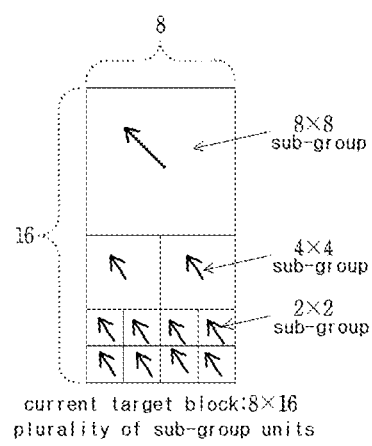

For example, as shown in FIG. 7D, when a size of a current target block is 8×16, $V_x$ and $V_y$ may be calculated in a unit of one 8×8 sub-group, two 4×4 sub-groups, and eight 2×2 sub-groups.

Alternatively, a size of a sub-group unit may be defined by using at least one of horizontal and vertical sizes of a current target block, a minimum depth information value for deriving $V_x$ and $V_y V_y$, and a predefined minimum sub-group size. The minimum depth information value may be transmitted by being entropy encoded.

For example, when a size of a current target block is 64×64, a minimum depth information value is 3, and a predefined minimum sub-group size is 4, a size of a sub-group unit may be determined as 8×8 by Formula 16 below.

$$\text{max(average length(horizontal,vertical)} \gg \text{minimum depth information value,predefined minimum sub-group size)} \qquad \text{[Formula 16]}$$

For example, when a size of a current target block is 128×64, a minimum depth information value is 3, and a predefined minimum sub-group size is 4, a size of a sub-group unit may be determined as 8×8 by Formula 17 below.

$$\text{max(min(horizontal,vertical)} \gg \text{minimum depth information value,predefined minimum sub-group size)} \qquad \text{[Formula 17]}$$

When BIO is applied to a current target block in a sub-group unit, whether or not to apply deblocking filtering in a sub-group unit may be determined, and then deblocking filtering for the current target block may be performed.

For example, when a size of a sub-group unit is 2×4 as shown in FIG. 7B, deblocking filtering may be performed by determining whether or not to apply deblocking filtering to boundaries between sub-groups having a horizontal length within the current target block being greater than 4, and to boundaries between sub-groups having a vertical length greater than 4.

When BIO is applied to a current target block in a sub-group unit, transform and inverse-transform may be performed in a sub-group unit.

For example, when a size of a sub-group unit is 4×4 as shown in FIG. 7A, transform and inverse-transform may be performed in a 4×4 sub-group unit.

Motion correction vectors $V_x$ and $V_y$ of a sub-group unit may be calculated from an $S_{group}$ value calculated in a sub-group unit.

The $S_{group}$ represents a group of $s_1$, $s_2$, $s_3$, $s_5$, and $s_6$ which are calculated for each sub-group. Each of $s_1$, $s_2$, $s_3$, $s_5$, and $s_6$ may be represented as S.

An $S_{group}$ value in a sub-group unit may be calculated from a S value calculated by using a gradient value ($G_x$, $G_y$) ($G_x$, $G_y$) at each pixel position without expansion of a current block. Block expansion may mean to calculate an S value at a current position by applying an N×N window based on a pixel of which an S value is calculated in consideration of S values of neighbor pixels.

For example, when a size of a sub-group of a current block is 4×4, a motion correction vector of a sub-group unit may be calculated as Formula 18 below by adding 16 S values calculated by using a gradient value at each pixel position without block expansion.

$$S_{group} = \left( \sum_{i=0}^{15} S_{1i}, \sum_{i=0}^{15} S_{2i}, \sum_{i=0}^{15} S_{3i}, \sum_{i=0}^{15} S_{5i}, \sum_{i=0}^{15} S_{6i} \right) \qquad \text{[Formula 18]}$$

FIGS. 8A, 8B and 8C are views showing a weight that may be applied to each S value within a sub-group so as to calculate a sub-group $S_{group}$.

When calculating an $S_{group}$ value in a sub-group unit, as shown in FIG. 8A, a value obtained by adding each of S value within a sub-group to which an identical weight is applied may be used as an $S_{group}$ value of a sub-group. When a gradient is calculated for inward positions within a sub-group as shown in. 6B, an S value calculated by a weighted sum of S values calculated by using the corresponding gradient may be used as an $S_{group}$ value of a sub-group.

When a gradient is calculated for inward positions within a sub-group as shown in FIG. 6D, and a gradient at an outward position is used by copying the calculated gradient, an S value calculated by a weighted sum of S values calculated by gradient values at inward positions may be used as an $S_{group}$ value of a sub-group.

When a gradient is calculated for inward positions within a sub-group as shown in FIG. 6D, and a gradient at an outward position is used by copying the calculated gradient, an S value calculated by adding S values calculated from gradient values of all positions within a sub-group may be used as an $S_{group}$ value of a sub-group.

When calculating an $S_{group}$ value in a sub-group unit, a value obtained by adding each S value within a sub-group to which different weight is applied as shown in FIG. 8B may be used as an $S_{group}$ value of a sub-group.

Alternatively, an S value at a specific position within a sub-group may be used as an $S_{group}$ of a sub-group. For example, as shown in FIG. 8C, when a size of a sub-group of a current block is 4×4, an S value at an $S_{10}$ position may be used as an $S_{group}$ of the corresponding sub-group. Information of the specific position may be preset in the encoder/decoder. Alternatively, the information may be signaled through a bitstream, or may be derived on the basis of a coding parameter (size, form, etc.) of a current block.

FIGS. 9A, 9B, 9C and 9D are views showing an embodiment of an S value by a weighted sum of S values at specific positions within a sub-group so as to calculate an $S_{group}$ of a sub-group.

As shown in FIG. 9A to FIG. 9D, an S value may be obtained by a weighted sum of S values at specific positions within sub-group, and used as an $S_{group}$.

By using an $S_{group}$ value of a sub-group unit calculated as above, motion correction vectors $V_x$ and $V_y$ of a sub-group unit may be calculated as Formula 7. By using the motion correction vectors $V_x$ and $V_y$, and a gradient value at each pixel position within a sub-group, a BIO offset value corresponding to $$\frac{\Delta G_x \cdot V_x + \Delta G_y \cdot V_y}{2}$$

in Formula 6 at each pixel position within the sub-group may be $$\frac{\Delta G_x \cdot V_x + \Delta G_y \cdot V_y}{2}$$

calculated. When calculating the BIO offset value, for a pixel position for which a gradient is not calculated, a gradient value calculated from the inside of the block may be copied as FIG. 6D, and used for the calculation.

An identical BIO offset may be applied to each pixel position within a sub-group by calculating a BIO offset in a sub-group unit by using a motion correction vector derived in a sub-group unit and a representative value of a gradient value at each pixel position within the sub-group. The representative value of the gradient value at each pixel position within the sub-group may mean at least one of a minimum value, a maximum value, an average value, a weighted average value, a mode, an interpolation value, and a median value of gradient values.

An identical BIO offset value may be applied to each pixel position within a sub-group by calculating a representative value of BIO offset values calculated from each pixel position within the sub-group. The representative may mean at least one of a minimum value, a maximum value, an average value, a weighted average value, a mode, an interpolation value, and a median value of offset values.

Motion correction vectors $V_x$ and $V_y$ of a sub-group unit may be calculated by using motion correction vectors $V_x$ and $V_y$ calculated in a pixel unit within a sub-group.

For example, when a size of a sub-group is 2×2, $V_x$ and $V_y$ of a sub-group may be calculated by Formula 19 below.

$$V_x = \text{average}(V_{x0}, V_{x1}, V_{x2}, V_{x3}), V_y = \text{average}(V_{y0}, V_{y1}, V_{y2}, V_{y3})$$

$$V_x = \min(V_{x0}, V_{x1}, V_{x2}, V_{x3}), V_y = \min(V_{y0}, V_{y1}, V_{y2}, V_{y3})$$

$$V_x = \max(V_{x0}, V_{x1}, V_{x2}, V_{x3}), V_y = \max(V_{y0}, V_{y1}, V_{y2}, V_{y3}) \quad \text{[Formula 19]}$$

Deriving $V_x$ and $V_y$ of a sub-group unit may be determined on the basis of a size of a current block. A sub-group unit may be determined on the basis of comparing a size of a current block with a predetermined threshold value. A predetermined threshold value may mean a reference size for determining a deriving unit of $V_x$ and $V_y$. The value may be represented in a form of at least one of a minimum value and a maximum value. A predetermined threshold value may be a fixed value predefined in the encoder/decoder, or may be variably derived on the basis of a coding parameter (for example, motion vector size, etc.) of a current block. Alternatively, the value may be signaled through a bitstream (for example, sequence, picture, slice, block level, etc.).

In an embodiment, for a block having a size in which the product of horizontal and vertical lengths is equal to or greater than 256, $V_x$ and $V_y$ may be calculated in a sub-group unit, otherwise $V_x$ and $V_y$ may be calculated in a pixel unit.

In an embodiment, for a block having a size in which a minimum length of horizontal and vertical lengths is equal to or greater than 8, $V_x$ and $V_y$ may be calculated in a sub-group unit, otherwise $V_x$ and $V_y$ may be calculated in a pixel unit.

An $S_{group} S_{group}$ value of a sub-group unit may be calculated from S values in a pixel unit in consideration of gradient values of pixel positions adjacent to a current block.

FIGS. 10A, 10B, 10C and 10D are views showing an embodiment of calculating an S value.

An S value at an left upper position (0,0) within a current block may be calculated in consideration of gradient values of neighbor pixel positions and a gradient value at the current position by applying a 5×5 window to the corresponding position. For a gradient value at a position outside of the current block, a gradient value within the current block may be used as shown in FIG. 10A or the value may be directly calculated and used. An S value at another position within the current block may be identically calculated.

An $S_{group}$ value of a sub-group unit within a current block may be calculated by applying weights different from each other according to a position. Herein, a gradient value within the current block may be used without block expansion.

For example, when a size of a sub-group is 2×2, a 5×5 window may be applied to each pixel position, and then an $S_{group}$ value of a sub-group may be calculated by applying a 6×6 weight table as shown in FIG. 10B to S values calculated in consideration of gradient value of neighbor pixel positions.

For example, when a size of a sub-group is 4×4, a 5×5 window may be applied to each pixel position, and then an $S_{group}$ value of a sub-group may be calculated by applying an 8×8 weight table shown in FIG. 10C to S values calculated in consideration of gradient values of neighbor pixel positions.

For example, when a size of a sub-group is 8×8, a 5×5 window may be applied to each pixel position, and then an $S_{group}$ value of a sub-group may be calculated by applying a 12×12 weight table shown in FIG. 10D to S values calculated in consideration of gradient values of neighbor pixel positions.

Figures 11A, 11B, 12:
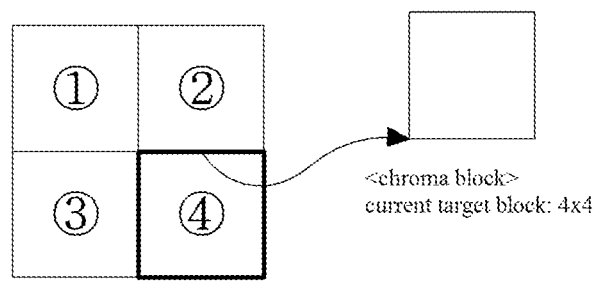
FIGS. 11A and 11B are views showing an embodiment of calculating an $S_{group}$ of a case where a size of a sub-group is 4×4.
FIG. 12 is a view showing an embodiment of deriving a motion vector of a chroma component on the basis of a luma component.

FIGS. 11A and 11B are views showing an embodiment of calculating an $S_{group}$ of a case where a size of a sub-group is 4×4. FIG. 11A is a view showing a gradient of pixel positions within a 4×4 block and neighbor pixel positions. FIG. 11B is a view showing an S value of pixel positions within a 4×4 block and neighbor pixel positions.

For example, when a size of a sub-group is 4×4, as shown in FIG. 11, an $S_{group}$ may be calculated by adding all S values of respective positions which are calculated from gradients of pixel positions of a current block and neighbor pixel position. For example, Formula 20 below may be used. Herein, a weight at each position may be identical predetermined value (for example, 1), or weights different from each other may be applied. When an S value of a neighbor pixel position is not usable, an $S_{group}$ may be calculated by adding usable neighbor S values to S values within current sub-group.

$$S_{group} = \left( \sum_{i=-1}^{4} \sum_{j=-1}^{4} S_{1i} S_{1j}, \sum_{i=-1}^{4} \sum_{j=-1}^{4} S_{2i} S_{2j}, \right. \quad \text{[Formula 20]}$$
$$\left. \sum_{i=-1}^{4} \sum_{j=-1}^{4} S_{3i} S_{3j}, \sum_{i=-1}^{4} \sum_{j=-1}^{4} S_{5i} S_{5j}, \sum_{i=-1}^{4} \sum_{j=-1}^{4} S_{6i} S_{6j} \right)$$

In an embodiment described above, according to a size of an M×N window applied to each pixel position, a size and a weight of a weight table may vary. M and N may be a natural number greater than 0, and M and N may be identical or different.

$V_x$ and $V_y$ calculated in a sub-group unit may be reflected in first motion information and second motion information so that motion information of a current block may be updated in a sub-group unit, and used for a following target block. When a motion vector is updated in a sub-group unit, motion information of the current block may be updated by using motion correction vectors $V_x$ and $V_y$ at a predefined predetermined sub-group position. When a size of a target block is 16×16 and a size of a sub-group is 4×4 as shown in FIG. 7A, a first motion vector of a current block and a motion vector in which a motion correction vector of a left upper first sub-group is reflected in a second motion vector may be stored as a motion vector of the current block.

Hereinafter, deriving a motion vector of a chroma component will be described.

According to an embodiment, motion correction vectors $V_x$ and $V_y$ calculated in a sub-group unit from a luma component may be reflected in a chroma component, and then used for motion compensation of a chroma component.

Alternatively, a motion vector obtained by reflecting a motion correction vector of a sub-group at a predefined relative position in first and second motion vectors of a current block may be used as a motion vector of a chroma component.

FIG. 12 is a view showing an embodiment of deriving a motion vector of a chroma component on the basis of a luma component.

As shown in FIG. 12, when a size of a current target block is 8×8 and a size of a sub-group is 4×4, a motion vector of a chroma block may be a motion vector obtained by reflecting motion correction vectors $V_x$ and $V_y$ of a sub-block in first motion vectors $MV_{0x}$ and $MV_{0y}$, and second motion vector $MV_{1x}$ and $MV_{1y}$, of the current target block. In other words, a motion vector of a chroma component may be derived as Formula 21 below.

first motion vector=$(MV_{0x}+V_x, MV_{0y}+V_y)$, second motion vector=$(MV_{1x}+V_x, MV_{1y}+V_y)$ [Formula 21]

As a motion correction vector for calculating a motion vector of the chroma block, a motion correction vector of another sub-block may be used rather than the motion correction vector of the sub-block ④. Alternatively, at least one of a maximum value, a minimum value, a median value, an average value, a weighted average value, and a mode of motion correction vectors of at least two sub-blocks among sub-blocks ① to ④ may be used.

Motion correction vectors $V_x$ and $V_y$ calculated in a sub-group unit from a luma component may be reflected in a chroma component (Cb, Cr), and then used for motion compensation of a chroma component.

Figure 13:
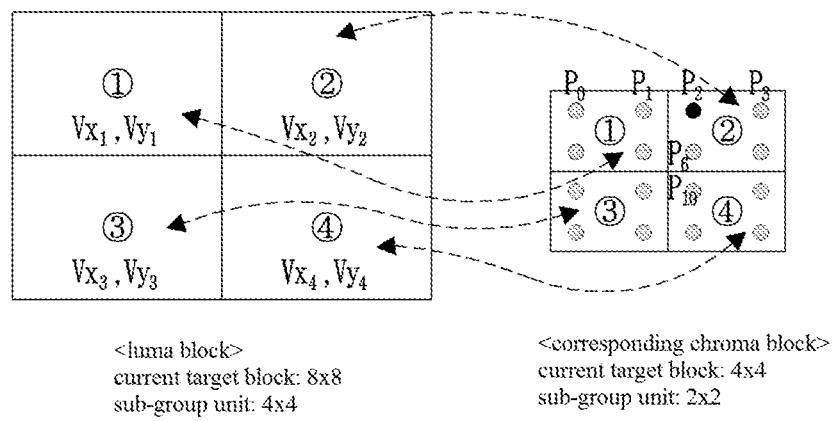
FIG. 13 is a view of an example showing motion compensation of a chroma component.

FIG. 13 is a view of an example showing motion compensation of a chroma component.

As shown in FIG. 13, when a size of a sub-group unit of a luma block is 4×4, a chroma block (Cb, Cr) in association thereto may be a sub-group having a size of 2×2, for a motion correction vector of each sub-group within a chroma block, a motion correction vector of a sub-group of a luma block in association thereto may be used.

For example, for motion correction vectors $V_{cx1}$ and $V_{cy1}$ of a first sub-group of a chroma block (Cb, Cr), motion correction vectors $V_{x1}$ and $V_{y1}$ of a first sub-group of a luma block in association thereto may be used.

Similar to a luma component, a BIO offset in a sub-group unit of a chroma component (Cb, Cr) may be calculated by using a motion correction vector value calculated in a sub-group unit of a chroma component (Cb, Cr), and a pixel value of a reconstructed chroma component (Cb, Cr). Herein, Formula 22 below may be used.

$$C_t = \frac{C_{t0} + C_{t1}}{2} + \frac{(G_{cx0} \cdot V_{cx0} - G_{cx1} \cdot V_{cx1}) + (G_{cy0} \cdot V_{cy0} - G_{cy1} \cdot V_{cy1})}{2} =$$

$$\frac{C_{t0} + C_{t1}}{2} + \frac{\Delta G_{cx} \cdot V_{cx} + \Delta G_{cy} \cdot V_{cy}}{2}$$

$$\Delta G_{cx} = G_{cx0} - G_{cx1}, \Delta G_{cy} = G_{cy0} - G_{cy1}$$

[Formula 22]

In Formula above, $\Delta G_{cx}$, $\Delta G_{cy}$ may be calculated from reconstructed pixels of reference pictures of a chroma component (Cb, Cr).

For example, $G_{cx}$ and $G_{cy}$ at a pixel value position within a second sub-group of a chroma component shown in FIG. 13 may be calculated as below.

$G_c$ of an x component at a P2 position may be calculated by the deviation between a pixel value at a P1 position and a pixel value at a P3 position.

$G_c$ of an x component at a P3 position may be calculated by the deviation between a pixel value at a P2 position and a pixel value at a P3 position.

$G_c$ of an y component at a P2 position may be calculated by the deviation between a pixel value at a P6 position and a pixel value at a P2 position.

$G_c$ of an y component at a P6 position may be calculated by the deviation between a pixel value at a P2 position and a pixel value at a P10 position.

The encoder may determine whether or not to perform BIO for a current block, and encode (for example, entropy encode) information indicating the same. Whether or not to perform BIO may be determined by comparing distortion values between a prediction signal before applying BIO and a prediction signal after applying BIO. The decoder may decode (for example, entropy decode) information indicating whether or not to perform BIO from a bitstream, and perform BIO according to received information.

Information indicating whether or not to perform BIO may be entropy encode/decode on the basis of a coding parameter of a current block. Alternatively, encoding/decoding information indicating whether or not to perform BIO may be omitted on the basis of a coding parameter of a current block. The coding parameter may include at least one of a prediction mode, precision of motion compensation, a size and a form of a current block, a division form (quad tree division or binary tree division, or three tree division), a global motion compensation mode, and a motion correction mode in the decoder.

For example, based on a prediction signal generated by performing motion compensation based on first motion information of a current block and a prediction signal generated by performing motion compensation based on second motion information, a precision of motion compensation may be determined. For example, a precision of motion compensation may be determined on the basis of a difference signal between the two prediction signals, or may be determined on the basis of comparing the difference signal with a predetermined threshold value. A predetermined threshold value means a reference value for determining whether or not to perform BIO by determining a precision of the difference signal. A predetermined threshold value may be represented in a form of at least one of a minimum value and a maximum value. A predetermined threshold value may be a fixed value predefined in the encoder/decoder, or may be a value determined by a coding parameter such as a size and a form of a current block, bit depth, etc., or may be a value signaled in an SPS, a PPS, a slice header, a tile, a CTU, and a CU level. In addition, whether or not to perform BIO for a current block may be determined in a sub-block unit. Whether or not to perform BIO in a sub-block unit may be determined on the basis of comparing a difference signal between two prediction signals corresponding to a sub-block in each sub-block unit with a predetermined threshold value. A predetermined threshold value used in a sub-block unit and a threshold value used in a block unit may be identical or different from each other. A threshold value may be represented in a form of at least one of a minimum value and a maximum value, may be a fixed value predefined in the encoder/decoder, may be a value determined according to a coding parameter such as a size and a form of a current block, bit depth, etc., or may be a value signaled through a SPS, a PPS, a slice header, a tile, a CTU, and a CU level.

For example, when a current block uses a merge mode, information indicating whether or not to perform BIO may be entropy encoded/decoded, and BIO may be always applied.

For example, when a current block uses an AMVP mode, information indicating whether or not to perform BIO may be entropy encoded/decoded, and BIO may be performed according to the information.

For example, when a current block uses an AMVP mode, information indicating whether or not to perform BIO may not be entropy encoded/decoded, and BIO may be always applied.

For example, when a current block uses a merge mode, information indicating whether or not to perform BIO may be entropy encoded/decoded, and BIO may be performed according to the information.

For example, when a current block uses an AMVP mode and for which motion compensation in a ¼ pixel (quarter) unit is performed, information indicating whether or not to perform BIO may not be entropy encoded/decoded, and BIO may be always applied. In addition, when a current block uses an AMVP mode and for which motion compensation in an integer pixel (1 pixel or 4 pixels) unit is performed, information indicating whether or not to perform BIO may be entropy encoded/decoded, and BIO may be performed according to the information.

For example, when a current block uses an AMVP mode and for which motion compensation in an integer pixel (1 pixel or 4 pixels) unit is performed, information indicating whether or not to perform BIO may not be entropy encoded/decoded, and BIO may be always applied. In addition when motion compensation in a ¼ pixel (quarter) unit is performed, information indicating whether or not to perform BIO may be entropy encoded/decoded, and BIO may be performed according to the information.

For example, when a current block uses an AMVP mode and has a size is equal to or smaller than a 256 luma pixel, information indicating whether or not to perform BIO may be entropy encoded/decoded, and BIO may be performed according to the information. Otherwise, BIO may be always performed.

For example, when a size of a current block is equal to or smaller than a predefine size, BIO may not be performed.

For example, when a size of a current block is equal to or smaller than a predefined, and the current block is divided by binary tree, BIO may not be performed.

For example, when a size of a current block is equal to or smaller than a predefined, and the current block is divided by three tree division, BIO may not be performed.

For example, when a current block uses an illumination compensation mode or affine mode, or a mode used when correcting motion information in the decoder (for example, PMMVD (pattern matched motion vector derivation), DMVR (decoder-side motion vector refinement)), or a current picture referencing (CPR₁) mode performing inter-prediction by referencing a current image including the current block, BIO may not be applied.

According to flag information entropy decoded in at least one of a CTU unit and a lower layer unit of a CTU, whether or not to apply BIO for a current target block may be determined. Herein, a lower layer unit may include at one of a lower layer unit of a CTU, a CU unit, and a PU unit.

For example, when a size of a CTU block is 128×128, and BIO related information in a 32×32 block unit that is a lower layer unit of the CTU block is entropy decoded, BIO may be performed in a 32×32 block unit on the basis of the BIO related information for a block belonging to a 32×32 block and having a size smaller than 32×32 block unit.

For example, when a depth of a CTU block is 0, and BIO related information is entropy decoded in a lower layer unit of the CTU block and which has a depth of 1, for a block included in a lower layer unit of the corresponding CTU block and having a depth of 1 or greater, BIO may be performed on the basis of the BIO related information entropy decoded in a lower layer unit of the CTU block and which has a depth of 1.

A final prediction sample signal of a current block may be generated by using a weighed sum of a prediction sample signal $P_{conventional\ bi\text{-}prediction}$ obtained by conventional bi-directional prediction and a prediction sample signal $P_{optical\ flow}$ obtained by BIO. Herein, Formula 23 below may be used.

$$P=(1-\sigma)P_{conventional\ bi\text{-}prediction}+\sigma P_{optical\ flow} \quad \text{[Formula 23]}$$

In Formula above, a weight (오류! 숫자가 아니면 안됩니다) applied to each block may be identical, or variably determined according to a coding parameter of a current block. The coding parameter may include at least one of a prediction mode, a precision of motion compensation, a size and a form of a current block, a division form (quad tree division, binary tree division, or three tree division), a global motion compensation mode, a motion correction mode in the decoder, a layer of a current picture to which a current block belongs.

For example, a weight σ may vary according to whether a current block uses a merge mode or an AMVP mode.

For example, when a current block uses an AMVP mode, a weight σ may vary according to whether or not the current block has a motion vector derivation (MVD) in a ¼ pixel (quarter) unit or in an integer unit.

For example, when a current block uses a merge mode, a weight a may vary according to a affine mode, an illumination compensation mode, and a mode used for correcting motion information in the decoder (for example, PMMVD, DMVR).

For example, a weight a may vary according to a size or a form or both of a current block.

For example, a weight a may vary according to a temporal layer of a current picture to which a current block belongs.

For example, when BIO is applied for a current block in a sub-group unit, a weight a may vary in a sub-group unit.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, an identifier that identifies the temporal layer may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

When a motion vector having at least one of a 16-pel unit, an 8-pel unit, a 4-pel unit, an integer-pel unit, ⅛-pel unit, 1/16-pel unit, 1/32-pel unit and 1/64-pel unit, the above embodiments of the present invention can also be applied. The motion vector may be selectively used for each pixel unit.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. A method of decoding an image, the method comprising:
dividing a current block to acquire a subblock of the current block;
determining whether to perform a subblock based BI-DIRECTIONAL OPTICAL FLOW (BIO) prediction on the subblock;
deriving a first direction prediction sample and a second direction prediction sample of the subblock;
deriving a BIO offset of the subblock;
generating a final prediction sample of the subblock block using the first direction prediction sample, the second direction prediction sample and the BIO offset; and
generating a reconstructed sample of the current block based on the final prediction sample,
wherein whether to perform the subblock based BIO prediction determines based on a result of comparing a threshold value and a difference between the first direction prediction sample and the second direction prediction sample,
wherein the threshold value is set using on a size of the current block, wherein the deriving a BIO offset comprising:
deriving a gradient using neighboring samples;
deriving a motion refining vector; and
deriving the BIO offset based on the gradient and the motion refining vector,
wherein the gradient is, when a position of the neighboring sample is a subpixel position, derived by rounding to an integer pixel position close to the subpixel position.

2. A method of encoding an image, the method comprising:
dividing a current block to acquire a subblock of the current block;
determining whether to perform a subblock based BI-DIRECTIONAL OPTICAL FLOW (BIO) prediction on the subblock;
deriving a first direction prediction sample and a second direction prediction sample of the subblock;
deriving a BIO offset of the subblock; and
generating a final prediction sample of the subblock using the first direction prediction sample, the second direction prediction sample and the BIO offset, and
encoding a bitstream based on the final prediction sample,
wherein whether to perform the subblock based BIO prediction determines based on a result of comparing a threshold value and a difference between the first direction prediction sample and the second direction prediction sample,
wherein the threshold value is set using on a size of the current block,
wherein the deriving a BIO offset comprising:
deriving a gradient using neighboring samples;
deriving a motion refining vector; and
deriving the BIO offset based on the gradient and the motion refining vector,
wherein the gradient is, when a position of the neighboring sample is a subpixel position, derived by rounding to an integer pixel position close to the subpixel position.

3. A non-transitory computer-readable recording medium storing instructions, which when executed by at least one processor perform a method for generating and transmitting a bitstream including encoded video data the method comprising:
dividing a current block to acquire a subblock of the current block;
determining whether to perform a subblock based BI-DIRECTIONAL OPTICAL FLOW (BIO) prediction on the subblock;
deriving a first direction prediction sample and a second direction prediction sample of the subblock;
deriving a BIO offset of the subblock; and
generating a final prediction sample of the subblock using the first direction prediction sample, the second direction prediction sample and the BIO offset; and
encoding the bitstream based on the final prediction sample,
wherein whether to perform the subblock based BIO prediction in units of subblock determines based on a result of comparing a threshold value and a difference between the first direction prediction sample and the second direction prediction sample,
wherein the threshold value is set using on a size of the current block,
wherein the deriving a BIO offset comprising:
deriving a gradient using neighboring samples;
deriving a motion refining vector; and
deriving the BIO offset based on the gradient and the motion refining vector,
wherein the gradient is, when a position of the neighboring sample is a subpixel position, derived by rounding to an integer pixel position close to the subpixel position.

* * * * *